(12) United States Patent
Zhang et al.

(10) Patent No.: US 11,993,013 B2
(45) Date of Patent: May 28, 2024

(54) MULTI-NOZZLE CONCURRENT PRINTING SYSTEM

(71) Applicant: Zhejiang University, Zhejiang (CN)

(72) Inventors: Bin Zhang, Zhejiang (CN); Qi Li, Zhejiang (CN); Yichen Luo, Zhejiang (CN); Teng Yang, Zhejiang (CN); Bo Zhang, Zhejiang (CN); Liang Ma, Zhejiang (CN); Huayong Yang, Zhejiang (CN)

(73) Assignee: Zhejiang University, Hangzhou (CN)

( * ) Notice: Subject to any disclaimer, the term of this patent is extended or adjusted under 35 U.S.C. 154(b) by 193 days.

(21) Appl. No.: 17/578,398

(22) Filed: Jan. 18, 2022

(65) Prior Publication Data

US 2022/0134654 A1      May 5, 2022

Related U.S. Application Data

(63) Continuation of application No. PCT/CN2020/110669, filed on Aug. 22, 2020.

(30) Foreign Application Priority Data

Aug. 22, 2019   (CN) .......................... 201910777590.1

(51) Int. Cl.
*B29C 64/209*      (2017.01)
*B29C 64/232*      (2017.01)
(Continued)

(52) U.S. Cl.
CPC .......... *B29C 64/209* (2017.08); *B29C 64/232* (2017.08); *B29C 64/236* (2017.08);
(Continued)

(58) Field of Classification Search
CPC ... B29C 64/209; B29C 64/232; B29C 64/245; B29C 64/236; B29C 64/35; B33Y 30/00; B33Y 40/10
See application file for complete search history.

(56) References Cited

U.S. PATENT DOCUMENTS

2018/0370116 A1   12/2018   Huang et al.

FOREIGN PATENT DOCUMENTS

| CN | 109421263 A | 3/2019 |
|---|---|---|
| CN | 109435474 A | 3/2019 |

(Continued)

OTHER PUBLICATIONS

International Search Report of PCT Patent Application No. PCT/CN2020/110669 dated Nov. 27, 2020.

*Primary Examiner* — Nahida Sultana
*Assistant Examiner* — Jamel M Nelson

(57) ABSTRACT

A multi-nozzle concurrent printing system includes a plurality of extrusion type nozzle assemblies, a three-axial translation mechanism and an objective table. Each nozzle assembly is provided with a nozzle, a storage barrel and a temperature control module; the three-axial translation mechanism includes an X-axial translation unit, a Y-axial translation unit and a Z-axial translation unit, and the nozzle assemblies are mounted on the Z-axial translation unit; and there are a plurality of nozzle assemblies, the printing system is provided with a concurrent calibration sensor, and the concurrent calibration sensor is taken as an original point of a coordinate system of the printing system. The printing system is provided with the plurality of nozzle assemblies which can work cooperatively or sequentially, the printing mode is flexible and changeable, and non-uniform mixing (Continued)

system forming of materials can be realized; and stable output of the materials in a formal printing task is guaranteed.

9 Claims, 9 Drawing Sheets

(51) Int. Cl.
*B29C 64/236* (2017.01)
*B29C 64/245* (2017.01)
*B29C 64/35* (2017.01)
*B33Y 30/00* (2015.01)
*B33Y 40/10* (2020.01)

(52) U.S. Cl.
CPC ............ *B29C 64/245* (2017.08); *B29C 64/35* (2017.08); *B33Y 30/00* (2014.12); *B33Y 40/10* (2020.01)

(56) References Cited

FOREIGN PATENT DOCUMENTS

| | | | | | |
|---|---|---|---|---|---|
| CN | 110039762 | A | * | 7/2019 | |
| CN | 110039762 | A | | 7/2019 | |
| CN | 110039774 | A | * | 7/2019 | |
| CN | 109435474 | B | * | 11/2019 | ............ B41J 2/1433 |
| CN | 110450405 | A | | 11/2019 | |
| CN | 110450418 | A | | 11/2019 | |
| CN | 110549618 | A | | 12/2019 | |
| IN | 110039774 | A | | 7/2019 | |

\* cited by examiner

MULTI-NOZZLE CONCURRENT PRINTING SYSTEM

CROSS REFERENCE TO RELATED APPLICATIONS

The present application is a Continuation Application of PCT Application No. PCT/CN2020/110669 filed on Aug. 22, 2020, which claims the benefit of Chinese Patent Application No. 201910777590.1 filed on Aug. 22, 2019. All the above are hereby incorporated by reference in their entirety.

TECHNICAL FIELD

The present invention relates to the technical field of biological 3D printing in tissue engineering, and particularly relates to a multi-nozzle concurrent printing system of high-precision bioprinting equipment.

BACKGROUND

Every year, an extremely large number of people suffer from various types of injuries around the world, resulting in tissue defects or some serious diseases that require organ transplantation, with a huge demand for the tissue and organ repair. Tissue and organ transplantation is an extremely effective method for the treatment of damaged large soft tissues and organs in the human body. However, due to the shortage of organ donor sources, immune rejection and other problems, there are insurmountable difficulties in the practical application of organ transplantation therapy. The tissue engineering has opened up a new approach to solve the above problems. Tissue engineering is to construct functional tissue substitutes by attaching living cells to biomaterial substrates or prepared scaffolds through a certain method, and then culture the constructed tissue substitute and implant into a patient's body to replace the original diseased tissue and organ, to recover the original body functions and achieve treatment of diseases. The current research and application of tissue-engineered skin is an effective example of the good development prospects of tissue engineering.

In recent years, the rapid development of 3D printing technology has opened up a new manufacturing mode for industrial manufacturing. In the biological field, technologies such as bioprinting and three-dimensional controlled tissues have also been applied. These technologies have the ability to manipulate single cells or single-component micro-sized droplets, and can precisely control the spatial location and distribution of the manipulated objects, which is of great significance for realizing the spatial location deposition of different kinds of cells and biomaterials during the construction of bulk tissues and organs. Therefore, the development of bioprinting technology is an inevitable trend of the tissue engineering research in the future. In a typical bioprinting device, the most critical part is the modeling of nozzle system.

In order to meet the manufacturing needs of large-size complex tissues and organs, especially for tissues and organs with obvious unitary structures such as the liver, multiple materials are often used in combination. When a skin is printed, blood vessels and other tissues need to be printed, if a single nozzle is used, there is a long process of replacing the nozzle, which will affect the efficiency, and the hydrogel may be solidified when the nozzle is just replaced. If the same nozzle is used for multiple infusion channels, it will lead to the problem of material mixing at the nozzle; and it cannot be printed simultaneously, and the efficiency is lower.

For the single nozzles available on the market, taking envisionTec as an example, the nozzle needs to be moved to the place of a new nozzle when changing materials each time, and the tool is changed by vacuum adsorption, which has the problems of long time and inability to guarantee the positioning accuracy. In addition, if a discrete hexagonal shape similar to liver cells is printed, there are gaps between the 6 blocks, and there will be long wiring; this will greatly limit the ability to print complex organs, and the printing time is too long and the efficiency is low.

SUMMARY

The present invention aims to provide a multi-nozzle printing system, wherein a plurality of nozzles work cooperatively to improve the printing capacity and efficiency of complex organs.

A biological 3D printing system comprises extrusion type nozzle assemblies and an objective table, wherein each nozzle assembly is provided with a nozzle, a storage barrel and a temperature control module; the system is further provided with a three-axial translation mechanism for driving the nozzle assemblies to translate along three axial directions (X axis, Y axis and Z axis), and the three-axial translation mechanism comprises an X-axial translation unit, a Y-axial translation unit and a Z-axial translation unit; and the nozzle assemblies are arranged on the Z-axial translation unit. The nozzles can move at any point of an XOY plane and lift along the Z axis; each nozzle assembly has independent storage, extrusion and printing functions; AND the objective table is used for receiving materials extruded by the nozzle assemblies. The temperature control module is used for keeping the temperature in the storage barrels so that the materials are kept at the temperature required during printing.

Multi-Nozzle Printing System

As a preferred solution, a plurality of nozzle assemblies are provided, each nozzle assembly is provided with a nozzle support, and each nozzle support is provided with a fixed part connected with the Z-axial translation unit and a mounting part connected with the corresponding nozzle assembly; the fixed parts and the mounting parts form inclination angles, and the nozzle assemblies are obliquely arranged. Inclination of the nozzle assemblies means that the nozzle assemblies and the Z axis are crossed to form included angles, the nozzles are obliquely arranged downwards, so motion interference between the storage barrels is avoided, and the plurality of nozzle assemblies can work cooperatively simultaneously.

As a preferred solution, an angle adjusting mechanism is arranged between the fixed part and the mounting part of each nozzle support. The angle adjusting mechanisms can be wedge blocks arranged between the nozzle supports and the nozzle assemblies, or the fixed parts are hinged with the mounting parts, and the mounting parts rotate relative to the fixed parts, thus the included angles between the mounting parts and the fixed parts can be adjusted, and the angles of the nozzle assemblies, relative to the Z axis, on the mounting parts can also be adjusted. When a specified angle is reached, the position between each fixed part and the corresponding mounting part is locked. The locking mode adopts the prior art, such as a ratchet and pawl mechanism and a screw fastening mode.

Preferably, the section of each nozzle support is a right triangle; the surface of the inclined edge of each nozzle support is a mounting part; and the surface of one right-angled edge of each nozzle support is a fixed part. The nozzle assemblies have rotating degrees of freedom in the mounting surface.

Preferably, at least one nozzle assembly is provided with a rotating mechanism; the rotating mechanism is arranged between each mounting part and the corresponding nozzle assembly; and the rotating degrees of freedom of the rotating mechanisms are unified with the nozzle assemblies. The rotating mechanisms use the fixed parts as reference surfaces to drive the nozzle assemblies to rotate in the planes of the fixed parts so as to adjust the angles of the nozzles relative to a working platform and relative angles among all the nozzles.

Preferably, each rotating mechanism comprises a rotating shaft and a rotating base; the rotating bases are fixed with the nozzle assemblies; and the rotating shafts are fixed with the mounting parts of the nozzle supports. External force is applied to the rotating bases for rotating around the rotating shafts to drive the nozzle assemblies to rotate so as to adjust the angles of the nozzles.

Preferably, the rotating mechanisms are mechanical turntables, the turntables are used as rotating seats, and locking screws or locking bolts are arranged between the turntables and the nozzle supports. When the locking screws or the locking bolts do not lock the turntables and the nozzle supports, the turntables can be rotated to adjust the angles of the nozzles. After the angles of the nozzles are adjusted, the turntables and the nozzle supports are locked by the locking screws or the locking bolts, and the turntables and the nozzles are positioned.

Or, the rotating shafts are connected with rotating motors.

Preferably, one or more nozzle assemblies are mounted on the rotating mechanisms; and/or one or more nozzle assemblies are mounted on each nozzle support; and/or a plurality of nozzle assemblies are mounted on each nozzle support, and a respective rotating mechanism is arranged between each nozzle assembly and the corresponding nozzle support. Therefore, the purpose of flexibly expanding the number of nozzles can be achieved by mounting the plurality of nozzle assemblies on the nozzle supports, and the expanded nozzles can have rotational degrees of freedom and can also be fixed in position.

By arranging the rotating mechanisms, the nozzle assemblies have rotational degrees of freedom, and the tips of the nozzles can be displaced at any angle within a stroke range so that the relative positions of the plurality of nozzle assemblies can be flexibly adjusted, and multi-nozzle concurrent printing can be realized. The multi-nozzle concurrent can be realized by aligning the plurality of nozzles to the same specified point or region at the same moment, and can also be realized by aligning the tips of the nozzles to the same point or region at different times.

Three-Axial Translation Mechanism

As a preferred solution, each nozzle assembly corresponds to a respective Z-axial translation unit; or at least two nozzle assemblies share one Z-axial translation unit.

Preferably, an X-direction translation mechanism comprises a fixed gantry, a movable gantry, an X-direction gantry guide rail matched with the movable gantry and an objective table guide rail matched with the objective table; the fixed gantry and the movable gantry are respectively provided with a Y-axial translation unit and a Z-axial translation unit, the Z-axial translation unit is mounted on the Y-axial translation unit in a sliding manner, and the nozzle supports are arranged on the Z-axial translation unit in a sliding manner; and each nozzle support corresponds to one Z-axial translation unit, and/or a plurality of nozzle supports share one Z-axial translation unit. That is, each nozzle support is arranged on the respective Z-axial translation unit, or a plurality of nozzle supports are arranged on one Z-axial translation unit; or one nozzle support corresponds to one Z-axial translation unit, and meanwhile, the plurality of nozzle supports share one Z-axial translation unit.

Preferably, the movable gantry and the fixed gantry are centered, a plurality of nozzle assemblies are arranged on the movable gantry, and a plurality of nozzle assemblies are arranged on the fixed gantry. The number of the nozzle assemblies on the movable gantry and the number of the nozzle assemblies on the fixed gantry can be the same or different.

Preferably, the nozzle assemblies on the movable gantry and the nozzle assemblies on the fixed gantry are symmetrical about the middle surface of the movable gantry and the middle surface of the fixed gantry.

As a preferred solution, the movable gantry is provided with three nozzle assemblies; the fixed gantry is provided with three nozzle assemblies; the nozzle assemblies on the same gantry, the nozzle assembly in the middle and the nozzle supports are fixedly connected; and the other nozzle assemblies are connected with the nozzle supports through the rotating mechanisms.

Preferably, the objective table guide rail is located between the movable gantry and the fixed gantry.

Preferably, each X-direction guide rail is provided with a first travel switch and a second travel switch, and a motion travel is formed between the two travel switches. In other words, the movable gantry horizontally moves between the first travel switch and the corresponding second travel switch of the guide rail of the movable gantry, and the objective table horizontally moves between the first travel switch and the second travel switch of the guide rail of the objective table.

The three-axial translation mechanism can realize the migration of any one nozzle assembly at any point of a three-dimensional coordinate system.

Multi-Nozzle Concurrent Printing

Based on the above multi-nozzle printing system or a conventional multi-nozzle printer, the solution for multi-nozzle concurrent printing is described in detail as follows.

As a preferred solution, the printing system is provided with a concurrent calibration sensor, and when the nozzles of all the nozzle assemblies touch the concurrent sensor, print path starting points of all the nozzle assemblies are concurrent. The concurrent calibration sensor is used to unify coordinate systems of all the nozzle assemblies into a world coordinate system.

Preferably, the concurrent calibration sensor comprises a calibration box, and the calibration box is provided with first direction emitters, first direction receivers, second direction emitters and a second direction receiver; a path from each first direction emitter to the corresponding first direction receiver and a path from each second direction emitter to the corresponding second direction receiver have an intersection point; and the intersection point is triggered by the needle points of the nozzles to indicate that the nozzle assemblies reach a zero position. Each nozzle assembly starts to perform a printing task from the zero position.

Preferably, a first direction and a second direction are orthogonal. Preferably, the first direction is an X-axial direction, and the second direction is a Y-axial direction; or the first direction is the Y-axial direction, and the second direction is the X-axial direction.

Preferably, a plurality of first direction emitters are provided, and each first direction emitter is provided with a corresponding first direction receiver; a plurality of second direction emitters are provided, and each second direction emitter is provided with a corresponding second direction receiver; a plurality of path intersection points are provided in two directions; and each intersection point corresponds to one nozzle assembly. During calibration, as long as the tip ends of nozzles of the nozzle assemblies reach a calibration area of the concurrent calibration sensor, it is considered that the zero position is reached. All the nozzle assemblies can reach the zero position at the same time, then all the nozzle assemblies can conduct printing tasks of different paths in parallel at the same time, and each nozzle assembly completes a part of the total task. Or, the plurality of nozzles can conduct synchronous cooperative printing on the same path, and therefore different biological materials can exist on one printing path.

Pre-Printing Module

In the above multi-nozzle printing system and/or the multi-nozzle concurrent printing solution, and/or in the existing 3D printing system, a pre-printing module is established, which is described in detail as follows.

As a preferred solution, the printing system is provided with a pre-printing module, wherein the pre-printing module comprises a pre-printing base; a cleaning nozzle, a reflux tank, a brush, a cutting line are arranged on the pre-printing base; the cleaning nozzle is positioned in the reflux tank; and the brush is positioned beside the reflux tank. The cleaning nozzle sprays cleaning liquid for washing the nozzles; then, the cleaning liquid is gathered in the reflux tank for discharge; the tip ends of nozzles of nozzle assemblies pass through the brush; the brush wipes and cleans the tip ends of the nozzles; then, the nozzle assemblies extrude materials outwardly until the sections of the extruded materials are stable; the nozzle assemblies pass through the cutting line; the cutting line cuts off the materials at the tip ends of the nozzles; and the nozzle assemblies move to the objective table for formal printing tasks.

As a preferred solution, the pre-printing module is provided with a pre-printing guide rail, and the pre-printing module is matched with the pre-printing guide rail in a sliding mode; the pre-printing module is provided with a motion driving mechanism. When the nozzle assemblies are used for pre-printing, the positions of the nozzle assemblies can be fixed, the pre-printing module moves to the position below the nozzle assemblies, and after pre-printing is completed, the pre-printing module is withdrawn from the nozzle assemblies; when the pre-printing module is withdrawn, the tip ends of the nozzles leave the cleaning nozzle and then make contact with the brush, finally, the cutting line cuts off the materials at the tip ends of the nozzles, and the withdrawing of the pre-printing module is completed. After the pre-printing module is withdrawn, the objective table moves to the positions below the nozzle assemblies.

The pre-printing module is arranged to clean the nozzles of the nozzle assemblies and remove residual materials generated in the last printing process, and after the extruded materials are stable, formal printing is conducted.

Nozzle Assemblies

A nozzle assembly structure that is suitable for the above multi-nozzle printing system, multi-nozzle concurrent printing system, printing system with pre-printing module and existing 3D printing system is described herein.

As a preferred solution, a nozzle assembly comprises a storage barrel, a plunger matched with the storage barrel, a temperature control module and a nozzle, wherein the temperature control module comprises a heat preservation barrel cover and a heat preservation barrel bottom; the storage barrel is provided with a temperature control area wrapped by the heat preservation barrel cover and the heat preservation barrel bottom; the storage barrel between the temperature control area and the corresponding nozzle is a heat preservation area; the storage barrels in the heat preservation areas are provided with heat preservation sleeves; the heat preservation barrel covers and the heat preservation barrel bottoms are hermetically connected to form medium cavities or medium pipelines; the medium cavities or the medium pipelines are provided with heating pieces; the heating pieces heat mediums in the medium cavities or the medium pipelines; the mediums exchange heat with the storage barrels to control the temperature of materials in the storage barrels.

Preferably, the temperature control module comprises a heat preservation layer and a water cooling plate; the heat preservation layers are located between the heat preservation barrel bottoms and the water cooling plates; the water cooling plates are connected with nozzle mounting pieces, and the nozzle mounting pieces are connected with nozzle supports or rotating mechanisms. Preferably, the nozzle mounting piece comprises a wing plate extending outwards from the outer edge of the water cooling plate, and a screw hole is formed in the wing plate. The wing plates are fixed to the nozzle supports or rotating bases through screws or bolts.

Preferably, the medium cavities or the medium pipelines are provided with medium inlets and medium outlets, the mediums are liquid heat-conducting mediums, and the storage barrels are made of heat-conducting medical metal materials. For example, stainless steel is a common heat-conducting medical metal material with good heat conductivity and good biocompatibility, and a titanium alloy material is also a common heat-conducting medical metal material. The liquid heat-conducting mediums can be oil. The liquid mediums wrap the storage barrels, the temperature control precision is high, the temperature difference of materials in the storage barrels is small, and the temperature consistency of the materials is good.

Preferably, the plungers are connected with pneumatic actuators. The pneumatic actuators can be, for example, cylinders. The nozzles are syringe needles.

The temperature control modules control the temperature of the storage barrels, and materials in the storage barrels are kept within a specified range. Moreover, the temperature control modules position and fix the storage barrels.

When 3D printing of biological tissue is conducted, the materials need to be kept within a given temperature range so that survival and reproduction of biological components can be facilitated, and therefore temperature control and heat preservation need to be conducted on the storage barrels. The nozzle assemblies are independent components in the 3D printing system.

Objective Table

The present invention provides an objective table structure suitable for the multi-nozzle printing system, the multi-nozzle concurrent printing system, a printing system with a pre-printing module and an existing 3D printing system.

The objective table is a working platform for receiving materials from the nozzle assemblies, realizing additive superposition and finally forming a 3D entity component; and the objective table is mounted on an objective table guide rail in a sliding manner.

As a preferred solution, the 3D printing system comprises the extrusion type nozzle assemblies and the objective table; and the objective table has an accommodating cavity matched with a printing vessel. During working, the printing vessel is positioned in the accommodating cavity, or one part of the printing vessel is positioned in the accommodating cavity. Therefore, the part, covering the printing vessel, of the accommodating cavity has the condition of mounting a temperature control module (such as an electric heating wire and an oil temperature cavity).

Temperature Control Module

The present invention provides a temperature control structure and solution combined with the objective table.

As a preferred solution, the objective table comprises the printing vessel and the temperature control module, and the temperature control module wraps the periphery of the printing vessel.

As a preferred solution, the temperature control module comprises a medium cavity or a medium pipeline; the medium cavity or the medium pipeline is provided with a containing cavity for containing the printing vessel, the containing cavity for containing the printing vessel is provided with a medium inlet and a medium outlet, and a liquid medium with working temperature is input into the medium cavity or the medium pipeline. That is, after the liquid medium outside the medium cavity reaches the specified temperature, the liquid medium is sent into the medium cavity or the medium pipeline, and the place for heating the liquid medium can be an external medium container and a heater, such as an oil temperature machine. The medium with the working temperature is continuously circulated between the external medium container and the medium cavity, the total amount of the liquid medium is large, the precision is high compared with that under the temperature control of a small amount of medium in the medium cavity, and the difficulty of the temperature control is reduced.

Preferably, the medium cavity is a complete communicated cavity.

Preferably, the printing vessel is a circular vessel, and the medium cavity is a circular cavity, or the medium cavity is a spiral pipeline. The shape of the medium cavity only needs to meet that the medium cavity can be uniformly matched with the printing vessel.

Clamp Module

In order to prevent the printing vessel from moving during working, the present invention provides a clamping solution for the printing vessel.

As a preferred solution, the objective table comprises a clamp module, and a printing vessel is fixed from the bottom through the clamp module.

Preferably, the clamp module comprises an adsorption seat, a vacuum pipeline and a vacuum air pump; the adsorption seat is provided with a micropore array, the micropore array communicates with the vacuum pipeline, and the vacuum pipeline is connected with the vacuum air pump. Before printing work is started, the printing vessel needs to be clamped and fixed, the printing vessel is placed on the adsorption seat, the vacuum air pump is started, negative pressure is formed between the adsorption seat and the printing vessel under the action of the micropore array and the vacuum pipeline, and the printing vessel is fixed.

Preferably, the micropore array is composed of a plurality of array units from inside to outside, the centers of all the array units are overlapped, and the outline defined by each array unit is the same as or similar to the shape of the working platform. Each array unit is provided with one or more micropores, and the adjacent micropores communicate through a communicating pipeline. Each array unit is provided with a valve assembly, and the valve assemblies are arranged on the vacuum pipeline, or the valve assemblies are arranged between the vacuum pipeline and the vacuum air pump. For example, the printing vessel is rectangular, and the array units are similar rectangles of the working platform. The micropores are formed by arranging the array units, and clamping of working platforms of different sizes can be achieved.

Preferably, the printing vessel is a circular vessel, the micropores of the array units form a circle, all the array units are arranged in a concentric circle mode, and the array unit at the centermost position is a central micropore. All concentric circle arrays or one (or more) of the concentric circle arrays can be selectively opened according to the size of the printing vessel, and the printing vessel is fixed.

Preferably, the circle centers of the array units are located in the center of the adsorption seat. The adsorption seat only needs to have the size for containing the array units, and the shape of the adsorption seat is not limited.

Multi-Nozzle Collaborative Bioprinting Method

The present invention provides a collaborative bioprinting method using the above multi-nozzle printing system and/or the above multi-nozzle concurrent printing system.

The multi-nozzle collaborative bioprinting method comprises the following steps: placing the concurrent calibration sensor at a path starting point of a printing task, determining the nozzle assemblies needing to perform the printing task, moving the nozzle assemblies to a zero position, and starting the printing task from the zero position by the nozzle assemblies in sequence, or executing the same printing path by all nozzle assemblies performing the printing task, and synchronously starting the printing task from the zero position along the printing path after all the nozzle assemblies reach the zero position.

As a preferred solution, the printing tasks are composed of a plurality of sub-paths, all the sub-paths intersect at one point, to obtain the distance from the origin of the coordinate system to the point of intersection. Or, the printing tasks are composed of a plurality of sub-paths, and the sub-paths are independent of each other, and the starting point position of each sub-path is obtained. The nozzle assemblies each perform sub-path printing tasks, and the nozzle assemblies work simultaneously.

For a printing method of an structure with multiple materials distributed at intervals or multiple materials distributed alternately, as a preferred solution, if the same printing path has multiple printing materials, the nozzle assemblies corresponding to the printing materials are selected as the nozzle assemblies for printing tasks, and a section of continuous path corresponding to each material serves as a sub-path; any sub-path serves as a current task path, the concurrent calibration sensor is moved to the starting point of the current task path, the current nozzle assembly corresponding to the current task path is moved to the zero position, and the concurrent calibration sensor is withdrawn; the current nozzle assembly moves along the current task path; after the current task path is completed, the next path is selected as the current path, and zero position calibration of the concurrent calibration sensor on the current nozzle assemblies and movement of the current nozzle assemblies along the current task path are repeated; and the steps are repeated till printing of all the sub-paths is completed. The starting point position of the current nozzle assembly is calibrated through the concurrent calibration sensor so that multi-material and multi-nozzle continuous cooperative printing is achieved, and printing of the multi-material complex structure can be achieved.

For the situation that a certain material serves as a main printing material, but auxiliary materials need to be added or compounded locally, as a preferred solution, the nozzle assemblies corresponding to the printing material are selected as the nozzle assemblies for conducting the printing tasks, the concurrent calibration sensor 6 is arranged at the starting point of the printing path, all the nozzle assemblies for conducting the printing tasks reach the zero positions, the concurrent calibration sensor 6 is removed, all the nozzle assemblies for conducting the printing tasks synchronously move along the printing task path, and each nozzle assembly extrudes the material in the task path corresponding to the material of the nozzle assembly and is closed in the non-task path.

For example, when skin tissues are printed, the main material is a corium layer material, but at a part with blood vessels, a blood vessel material and the corium layer material are extruded at the same time, or only the blood vessel material is extruded, thus additive construction of the tissues is realized. After the blood vessel part is printed, the nozzle assemblies for the blood vessel material are closed, and the nozzle assemblies for the corium layer material work. For another example, a certain tissue is made of a basic material, but on the basis of the structure of the basic material, living cells need to be implanted, and then the nozzle assemblies for the basic material works along the printing path, and when the nozzle assemblies reach a position where the living cells need to be implanted, the nozzle assemblies corresponding to the living cell material are also opened to integrate the living cells. Possibly, various materials are compounded in the same printing path, and at the moment, the plurality of nozzle assemblies are opened at the same time to perform the printing task. Possibly, two slice layers are of different materials, at the moment, the nozzle assemblies for the first slice layer material are opened, the nozzle assemblies for the next slice layer material are closed, and after the printing task of the current slice layer is completed, the nozzle assemblies for the current slice layer material are closed; and all the nozzle assemblies are displaced to the height of the next slice layer, the nozzle assemblies for the next slice layer material are used as the nozzle assemblies for the current slice layer material, printing is started, and the operation is continuously carried out in such a way until the printing task is finished, etc.

The present invention has the following advantages:

1. The system is provided with the plurality of nozzle assemblies, each nozzle assembly at least has three axial translation degrees of freedom, some nozzle assemblies are additionally provided with rotation degrees of freedom (namely four degrees of freedom); the positions and angles of the nozzle assemblies can be adjusted; the nozzle assemblies can work cooperatively or sequentially; multi-path and multi-material printing can be achieved in one printing task so that repeated calibration and cyclic printing processing of nanoscale multicellular unit components are avoided; one-time molding is beneficial to expression of unit functions; and the efficiency of constructing large tissue structures and organs is improved from the unit level, and meanwhile the quality of 3D printing biological tissue is improved from the function level.

2. The plurality of nozzles work cooperatively, so multiple feeding printing modes such as layer-by-layer alternate printing of multiple materials, same-layer non-uniform mixed printing of the multiple materials, single-material printing and local composite additional materials of main materials can be achieved; the printing modes are flexible and changeable; non-uniform mixed system molding of the materials can be achieved; and an actual biological system can be simulated more truly;

3. Each nozzle assembly can share three axial translation mechanisms and can also have independent motion freedom degrees, and the plurality of nozzles can synchronously conduct respective printing tasks at different positions. For example, when the liver is printed, each nozzle prints one liver unit, or each nozzle prints one part of the liver unit;

4. A pre-printing area is arranged, the tip ends of nozzles of the nozzle assemblies are washed and cleaned, and stable output of the materials in the formal printing task is guaranteed.

5. Temperature control is conducted on the printing vessel of the objective table through peripheral surrounding type heat exchange, the medium is continuously and circularly input into the medium cavity after the temperature of the medium is controlled in the external medium container, and the medium temperature is controlled precisely and easily.

6. The printing vessel is clamped in a bottom adsorption mode, the number of connection valve assemblies can be selected according to the size of the printing vessel, and stable and complete adsorption of the printing vessel is achieved.

7. Peripheral surrounding type temperature control and bottom vacuum adsorption clamping are conducted on the printing vessel, temperature control and clamping stationary phases do not interfere with each other, the printing vessel can be adsorbed reliably, and the precision of a molded structure is improved; and meanwhile, the requirement for the environment temperature in bioprinting is considered, the quality of the molded living body structure is effectively guaranteed, and the survival rate of living body tissue is increased.

Figure 1:
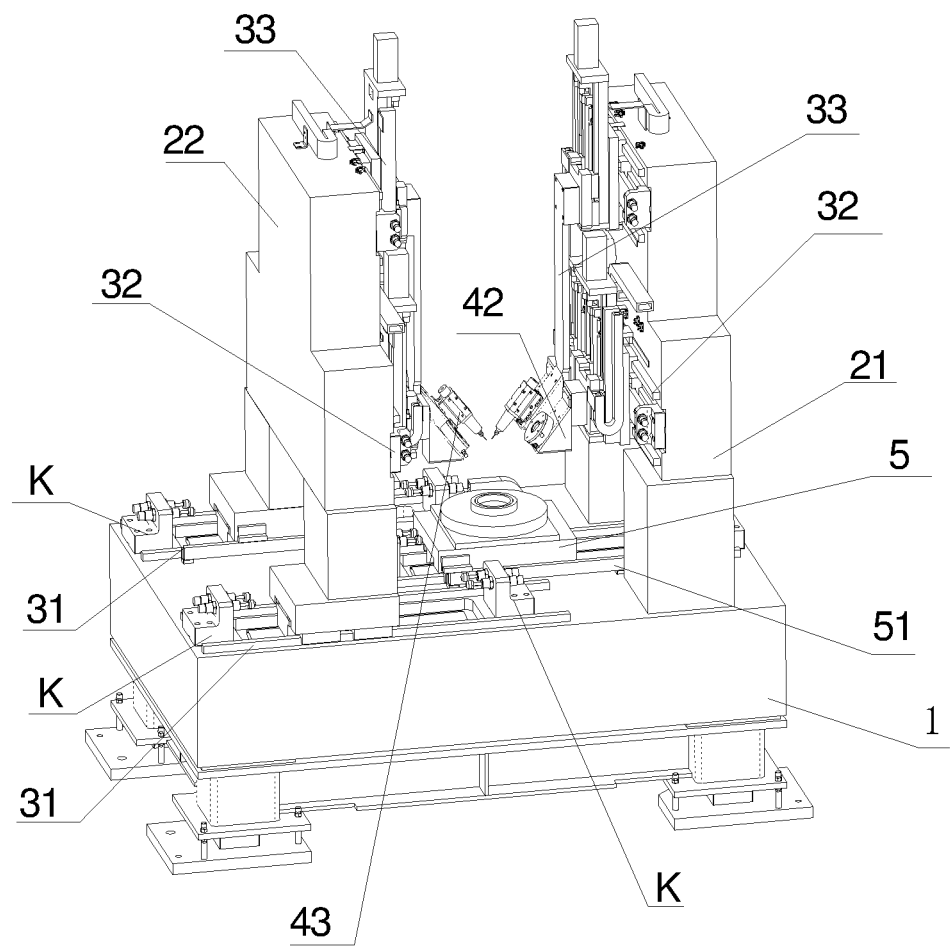
FIG. 1 is an overall schematic diagram of the present invention.

Reference numerals: travel switch K; base 1; objective table 5; concurrent calibration sensor 6; printing vessel 8; fixed gantry 21; movable gantry 22; X-axial translation unit 31; Y-axial translation unit 32; Z-axial translation unit 33; storage barrel 41; nozzle support 42; temperature control module 43; nozzle 45; objective table guide rail 51; temperature control module 52; containing cavity 53; adsorption seat 54; first direction emitter 61; first direction receiver 62; second direction emitter 63; second direction receiver 64; pre-printing base 71; cleaning nozzle 72; reflux tank 73; brush 74; material bearing area 75; cutting line 76; heat preservation barrel cover 431; heat preservation barrel bottom 432; water cooling plate 433; heat preservation layer 434; heating piece 435; heat preservation sleeve 436; nozzle mounting piece 437; locking screw 441; rotating base 442; rotating shaft 443; medium inlet 521; medium outlet 522; micropore array 541; vacuum pipeline 542; valve assembly 543; vacuum air pump 544; oil temperature machine 560.

DETAILED DESCRIPTION

The structure and working process of the present invention will be described in detail with reference to the accompanying drawings.

Multi-Nozzle Biological 3D Printing System

As shown in FIG. 1, a multi-nozzle biological 3D printing system comprises extrusion type nozzle assemblies, an objective table 5 and a three-axial translation mechanism, wherein each nozzle assembly is provided with a nozzle 45, a storage barrel 41 and a temperature control module 43; the three-axial translation mechanism drives the nozzle assemblies to translate in three axial directions (X axis, Y axis and Z axis), and the three-axial translation mechanism comprises an X-axial translation unit 31, a Y-axial translation unit 32 and a Z-axial translation unit 33; the nozzle assemblies are mounted on the Z-axial translation unit 33; the nozzles can move at any point of an XOY plane and lift in the Z-axial direction; the nozzle assemblies have independent storage, extrusion and printing functions; the objective table 5 is used for receiving materials extruded by the nozzle assemblies; the temperature control modules 43 keep the temperature in the storage barrels 41 so that the materials are kept at the temperature required during printing. The bioprinting system is provided with a plurality of nozzle assemblies, each nozzle assembly is provided with a nozzle support 42, and each nozzle support 42 is provided with a fixed part connected with the Z-axial translation unit 33 and a mounting part connected with the corresponding nozzle assembly; the fixed parts and the mounting parts form inclination angles, and the nozzle assemblies are obliquely arranged. Inclination of the nozzle assemblies means that the nozzle assemblies and the Z axis are crossed to form included angles, the nozzles 45 are obliquely arranged downwards, so motion interference between the storage barrels 41 is avoided, and the plurality of nozzle assemblies can work cooperatively simultaneously.

Materials

The materials described in the present invention are materials or mixtures used for being processed by a printer. When a 3D printer is used for processing, some existing biological materials can be used for printing. For example, many materials including natural polymers such as collagen, silk fibers, gelatin and alginate and synthetic polymers such as polyethylene glycol (PEG) or any mixture of the materials can be used for being processed by the printer. The materials used for biological 3D printing are also called as "biological ink". Although the materials belong to traditional materials, the materials can be printed by adopting the printing equipment and method of the present invention. The printed biological materials have a three-dimensional space structure or a four-dimensional space, and any through hole can be formed. The through hole is generally of a planar structure or a three-dimensional structure. For example, holes are formed in the plane, and the shape of the holes can be any shape, such as a circle, a rectangle, a square and a rhombus. When multiple surfaces are in different dimensions, a three-dimensional shape is formed, each surface or multiple surfaces of the three-dimensional shape has a hole structure, the holes have a certain depth, and the holes can be communicated with one another, can be not communicated with one another or are partially communicated with one another, thus a channel penetrating through the whole three-dimensional structure or a part of the three-dimensional structure is formed. Therefore, the structure is easily realized by adopting the printer.

In some embodiments, the materials in the present invention can be mixed with stem cells for processing or printing so that the material serves as a stent structure, the cells serve as active components and can be differentiated, and finally, active tissues are formed. Certainly, the stent structure can also be printed, then the stem cells are filled in a space of a skeleton, and finally, active tissues are also formed.

In a word, the newly designed printing system can be used for printing all proper materials.

In some embodiments, the storage barrels 41 are containers for containing biological materials and have good biocompatibility, and different storage barrels 41 can be used for containing the same materials. Optionally, different materials or biological ink can be contained in the storage barrels 41. For example, the storage barrel A contains one biological material, the storage barrel B contains another biological material, and the two materials are different in property. By the adoption of the printing technology of the present invention, complex biological tissue or organ printing can be achieved due to the fact that the structure of the biological material or organ is not uniform and consistent but is different in structure or biological property. For example, skin materials of mammals comprise epidermis and dermis, the dermis comprises blood vessels and tissue connected with muscles, the different portions are different in structure and thickness, the transition structures between the tissue are different, and such difference further includes density, aperture, etc. In this way, if printing needs to be conducted in a traditional way, all the structures or tissue are printed the same. By the adoption of the printing technology of the present invention, biological materials of different structures can be printed at a time.

Figure 4:
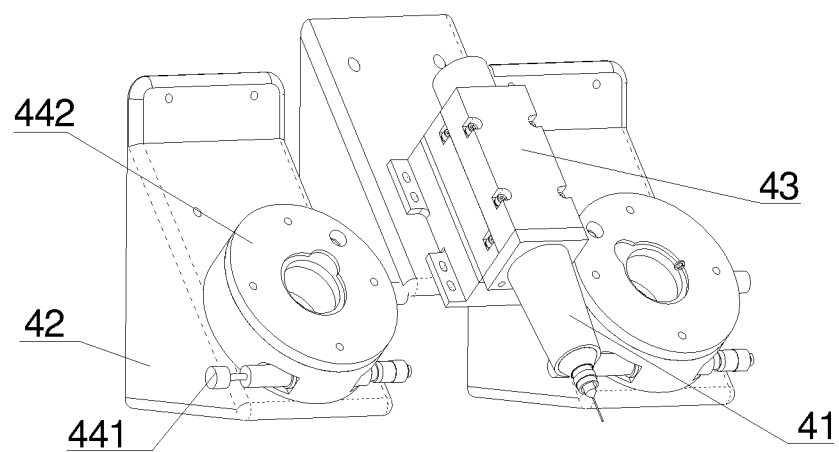
FIG. 4 is a schematic diagram of mounting nozzle assemblies on nozzle supports.

In some specific embodiments, as shown in FIG. 4, an angle adjusting mechanism is arranged between the fixed part and the mounting part of each nozzle support 42. The angle adjusting mechanisms can be wedge blocks arranged between the nozzle supports 42 and the nozzle assemblies, or the fixed parts are hinged with the mounting parts, and the mounting parts rotate relative to the fixed parts, thus the included angles between the mounting parts and the fixed parts can be adjusted, and the angles of the nozzle assemblies, relative to the Z axis, on the mounting parts can also be adjusted. When a specified angle is reached, the position between each fixed part and the corresponding mounting part is locked. The locking mode adopts the prior art, such as a ratchet and pawl mechanism and a screw fastening mode.

In some specific embodiments, as shown in FIG. 4, the section of the support of each nozzle 45 is a right triangle; the surface of the inclined edge of the support of each nozzle 45 is a mounting part; and the surface of one right-angled edge of the support of each nozzle 45 is a fixed part. The nozzle 45 assemblies have rotating degrees of freedom in the mounting surface.

Rotating Mechanisms

By arranging the rotating mechanisms, the nozzle assemblies have rotational degrees of freedom, and the tips of the nozzles can be displaced at any angle within a stroke range so that the relative positions of the plurality of nozzle assemblies can be flexibly adjusted, and multi-nozzle concurrent printing can be realized. The multi-nozzle concurrent can be realized by aligning the plurality of nozzles to the same specified point or region at the same moment, and can also be realized by aligning the tips of the nozzles to the same point or region at different times.

Figure 5:
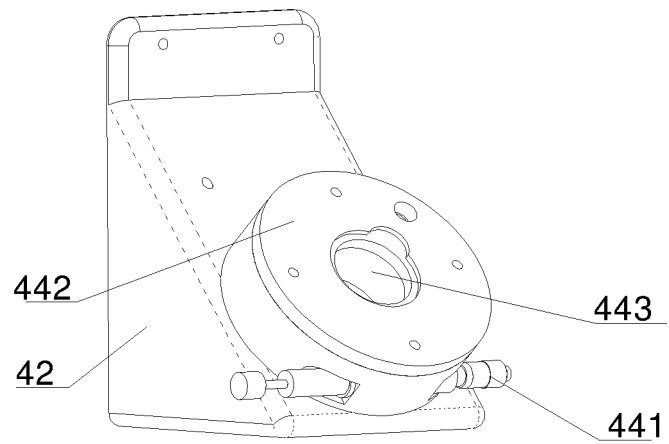
FIG. 5 is a schematic diagram of arranging rotating seats on nozzle supports.

In some specific embodiments, as shown in FIG. 5, at least one nozzle assembly is provided with the rotating mechanism; the rotating mechanism is arranged between each mounting part and the corresponding nozzle assembly; and the rotating degrees of freedom of the rotating mechanisms are unified with the nozzle assemblies. The rotating mechanisms use the fixed parts as reference surfaces to drive the nozzle assemblies to rotate in the planes of the fixed parts so as to adjust the angles of the nozzles 45 relative to a working platform and relative angles among all the nozzles 45.

In some specific embodiments, each rotating mechanism comprises a rotating shaft 443 and a rotating base 442; the rotating bases 442 are fixed with the nozzle assemblies; and the rotating shafts 443 are fixed with the mounting parts of the nozzle supports 42. External force is applied to the rotating bases 442 for rotating around the rotating shafts 443 to drive the nozzle assemblies to rotate so as to adjust the angles of the nozzles 45.

In some specific embodiments, the rotating mechanisms are mechanical turntables, the turntables are used as rotating bases 442, and locking screws 441 or locking bolts are arranged between the turntables and the nozzle supports 42. When the locking screws 441 or the locking bolts do not lock the turntables and the nozzle supports 42, the turntables can be rotated to adjust the angles of the nozzles 45. After the angles of the nozzles 45 are adjusted, the turntables and the nozzle supports 42 are locked by the locking screws 441 or the locking bolts, and the turntables and the nozzles 45 are positioned. Or, the rotating shafts 443 are connected with rotating motors.

In some specific embodiments, one or more nozzle assemblies are mounted on the rotating mechanisms; and/or one or more nozzle assemblies are mounted on each nozzle support 42; and/or a plurality of nozzle assemblies are mounted on each nozzle support 42, and a respective rotating mechanism is arranged between each nozzle assembly and the corresponding nozzle support 42. Therefore, the purpose of flexibly expanding the number of nozzles can be achieved by mounting the plurality of nozzle assemblies on the nozzle supports 42, and the expanded nozzles can have rotational degrees of freedom and can also be fixed in position.

Three-Axial Translation Mechanism

The three-axial translation mechanism can realize the migration of any one nozzle assembly at any point of a three-dimensional coordinate system.

In some specific embodiments, each nozzle assembly corresponds to a respective Z-axial translation unit 33; or at least two nozzle assemblies share one Z-axial translation unit 33.

Figure 2:
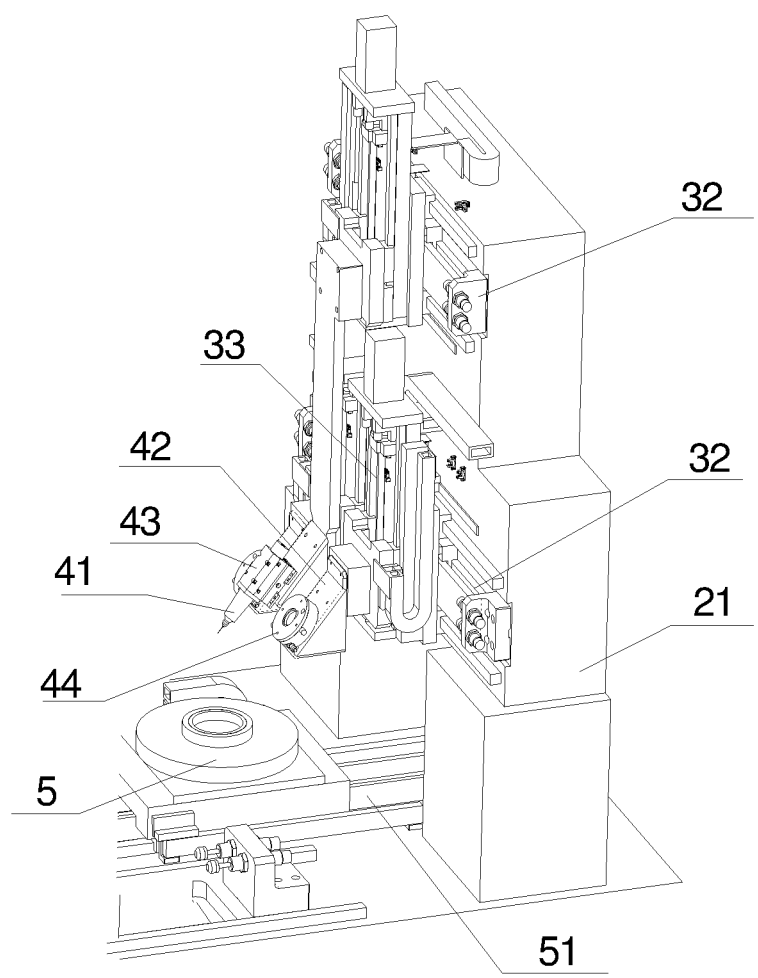
FIG. 2 is a schematic diagram of loading nozzle assemblies on a fixed gantry.
Figure 3:
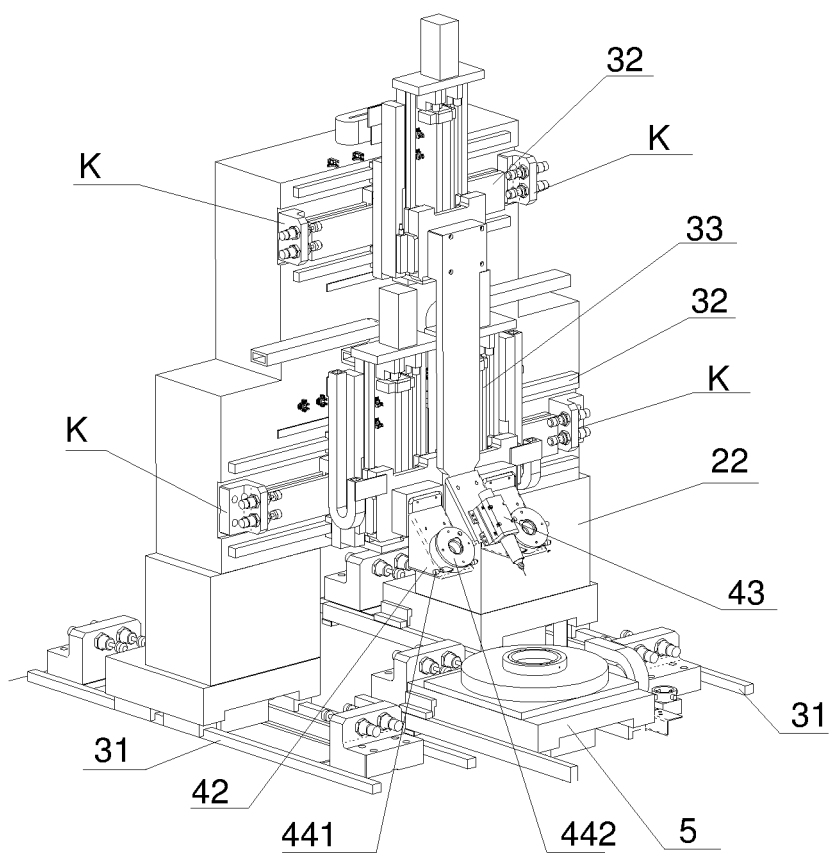
FIG. 3 is a schematic diagram of loading nozzle assemblies on a movable gantry.

As shown in FIG. 2 and FIG. 3, an X-direction translation mechanism comprises a fixed gantry 21, a movable gantry 22, an X-direction gantry guide rail matched with the movable gantry 22 and an objective table guide rail 51 matched with the objective table 5; the fixed gantry 21 and the movable gantry 22 are respectively provided with a Y-axial translation unit 32 and a Z-axial translation unit 33, the Z-axial translation unit 33 is mounted on the Y-axial translation unit 32 in a sliding manner, and the nozzle supports 42 are arranged on the Z-axial translation unit 33 in a sliding manner; and each nozzle support 42 corresponds to one Z-axial translation unit 33, and/or a plurality of nozzle supports 42 share one Z-axial translation unit 33. That is, each nozzle support 42 is arranged on the respective Z-axial translation unit 33, or a plurality of nozzle supports 42 are arranged on one Z-axial translation unit 33; or one nozzle support 42 corresponds to one Z-axial translation unit 33, and meanwhile, the plurality of nozzle supports 42 share one Z-axial translation unit 33.

As shown in FIG. 2 and FIG. 3, the movable gantry 22 and the fixed gantry 21 are centered, a plurality of nozzle assemblies are arranged on the movable gantry 22, and a plurality of nozzle assemblies are arranged on the fixed gantry 21. The number of the nozzle assemblies on the movable gantry 22 and the number of the nozzle assemblies on the fixed gantry 21 can be the same or different.

As shown in FIG. 2 and FIG. 3, the nozzle assemblies on the movable gantry 22 and the nozzle assemblies on the fixed gantry 21 are symmetrical about the middle surface of the movable gantry 22 and the middle surface of the fixed gantry 21.

As shown in FIG. 2 and FIG. 3, the movable gantry 22 is provided with three nozzle assemblies; the fixed gantry 21 is provided with three nozzle assemblies; the nozzle assemblies on the same gantry, the nozzle assembly in the middle and the nozzle supports 42 are fixedly connected; and the other nozzle assemblies are connected with the nozzle supports 42 through the rotating mechanisms. Generally, the six nozzle assemblies can meet most printing tasks. However, when the six nozzle assemblies cannot meet the printing tasks, the six nozzle assemblies can be preferentially expanded from the nozzle assembly on the outer side, and the nozzle assembly on the outer side is expanded into two or more nozzle assemblies sharing one nozzle support 42.

In some specific embodiments, as shown in FIG. 1, the objective table guide rail 51 is located between the movable gantry 22 and the fixed gantry 21.

As shown in FIGS. 1, 2 and 3, each X-direction guide rail is provided with a first travel switch K and a second travel switch K, and a motion travel is formed between the two travel switches K. In other words, the movable gantry 22 horizontally moves between the first travel switch K and the corresponding second travel switch K of the guide rail of the movable gantry 22, and the objective table 5 horizontally moves between the first travel switch K and the second travel switch K of the guide rail of the objective table 5.

Nozzle Assemblies

Figure 6:
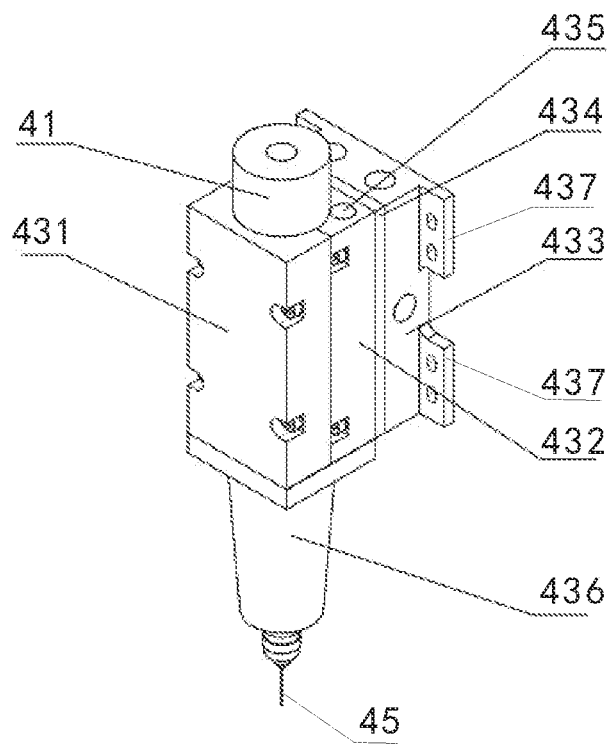
FIG. 6 is a schematic diagram of nozzle assemblies.

In some embodiments, as shown in FIG. 6, each nozzle assembly comprises a storage barrel 41, a plunger matched with the storage barrel 41, a temperature control module 43 and a nozzle 45, wherein each temperature control module 43 comprises a heat preservation barrel cover 431 and a heat preservation barrel bottom 432; each storage barrel 41 is provided with a temperature control area wrapped by the heat preservation barrel cover 431 and the heat preservation barrel bottom 432; the storage barrel 41 between each temperature control area and the corresponding nozzle is a heat preservation area; the storage barrels 41 in the heat preservation areas are provided with heat preservation sleeves 436; the heat preservation barrel covers 431 and the heat preservation barrel bottoms 432 are hermetically connected to form medium cavities or medium pipelines; the medium cavities or the medium pipelines are provided with heating pieces 435; the heating pieces 435 heat mediums in the medium cavities or the medium pipelines; the mediums exchange heat with the storage barrels 41 to control the temperature of materials in the storage barrels 41. Generally, the mediums of the nozzle assemblies are water. The heating pieces are electric heating wires or semiconductor chips, etc.

Each temperature control module 43 comprises a heat preservation layer 434 and a water cooling plate; the heat preservation layers 434 are located between the heat preservation barrel bottoms 432 and the water cooling plates; the water cooling plates are connected with nozzle mounting pieces 437, and the nozzle mounting pieces 437 are connected with nozzle supports 42 or rotating mechanisms. Preferably, each nozzle mounting piece 437 comprises a wing plate extending outwards from the outer edge of each water cooling plate 433, and a screw hole is formed in each wing plate. The wing plates are fixed to the nozzle supports 42 or rotating bases 442 through screws or bolts.

The medium cavities or the medium pipelines are provided with medium inlets 521 and medium outlets 522, the mediums are liquid heat-conducting mediums, and the storage barrels 41 are made of heat-conducting medical metal materials. For example, stainless steel is a common heat-conducting medical metal material with good heat conductivity and good biocompatibility, and a titanium alloy material is also a common heat-conducting medical metal material. The liquid heat-conducting mediums can be oil. The liquid mediums wrap the storage barrels 41, the temperature control precision is high, the temperature difference of materials in the storage barrels 41 is small, and the temperature consistency of the materials is good.

The plungers are connected with pneumatic actuators. The pneumatic actuators can be cylinders. The nozzles 45 are syringe needles.

The temperature control modules 43 control the temperature of the storage barrels 41, and materials in the storage barrels 41 are kept within a specified range. Moreover, the temperature control modules 43 position and fix the storage barrels 41.

When 3D printing of biological tissue is conducted, the materials need to be kept within a given temperature range so that survival and reproduction of biological components can be facilitated, and therefore temperature control and heat preservation need to be conducted on the storage barrels 41. The nozzle assemblies are independent components in the 3D printing system.

Multi-Nozzle Concurrent Printing

Figure 7:
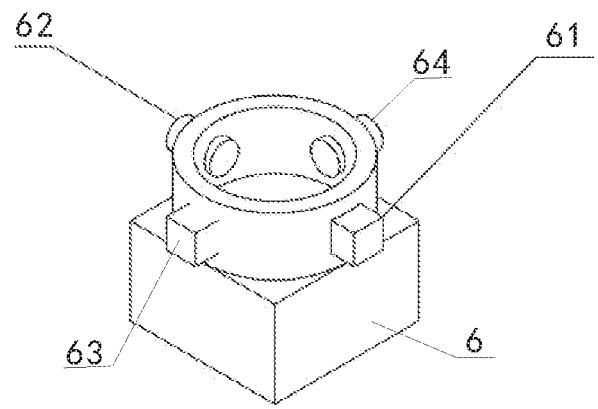
FIG. 7 is a schematic diagram of a concurrent calibration sensor.

In some embodiments, as shown in FIG. 7, the biological 3D printing system is provided with a plurality of nozzle assemblies and a concurrent calibration sensor 6, and when the nozzles 45 of all the nozzle assemblies touch the concurrent sensor, print path starting points of all the nozzle assemblies are concurrent. The concurrent calibration sensor 6 is used to unify coordinate systems of all the nozzle assemblies into a world coordinate system.

In some specific embodiments, as shown in FIG. 7, the concurrent calibration sensor 6 comprises a calibration box, and the calibration box is provided with first direction emitters 61, first direction receivers 62, second direction emitters 63 and a second direction receiver 64; a path from each first direction emitter 61 to the corresponding first direction receiver 62 and a path from each second direction emitter 63 to the corresponding second direction receiver 64 have an intersection point; and the intersection point is triggered by the needle points of the nozzles 45 to indicate that the nozzle assemblies reach a zero position. Each nozzle assembly starts to perform a printing task from the zero position.

In some specific embodiments, a first direction and a second direction are orthogonal. For example, the first direction is an X-axial direction, and the second direction is a Y-axial direction; or the first direction is the Y-axial direction, and the second direction is the X-axial direction.

In some specific embodiments, a plurality of first direction emitters 61 are provided, and each first direction emitter 61 is provided with a corresponding first direction receiver 62; a plurality of second direction emitters 63 are provided, and each second direction emitter 63 is provided with a corresponding second direction receiver 64; a plurality of path intersection points are provided in two directions; and each intersection point corresponds to one nozzle assembly. During calibration, as long as the tip ends of nozzles 45 of the nozzle assemblies reach a calibration area of the concurrent calibration sensor 6, it is considered that the zero position is reached. All the nozzle assemblies can reach the zero position at the same time, then all the nozzle assemblies can conduct printing tasks of different paths in parallel at the same time, and each nozzle assembly completes a part of the total task. Or, the plurality of nozzles can conduct synchronous cooperative printing on the same path, and therefore different biological materials can exist on one printing path.

Pre-Printing Module

Figure 8:
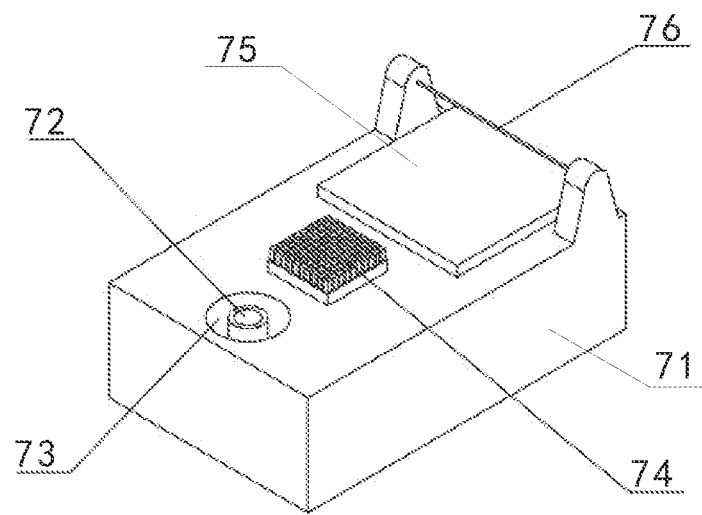
FIG. 8 is a schematic diagram of a pre-printing module.
Figure 9:
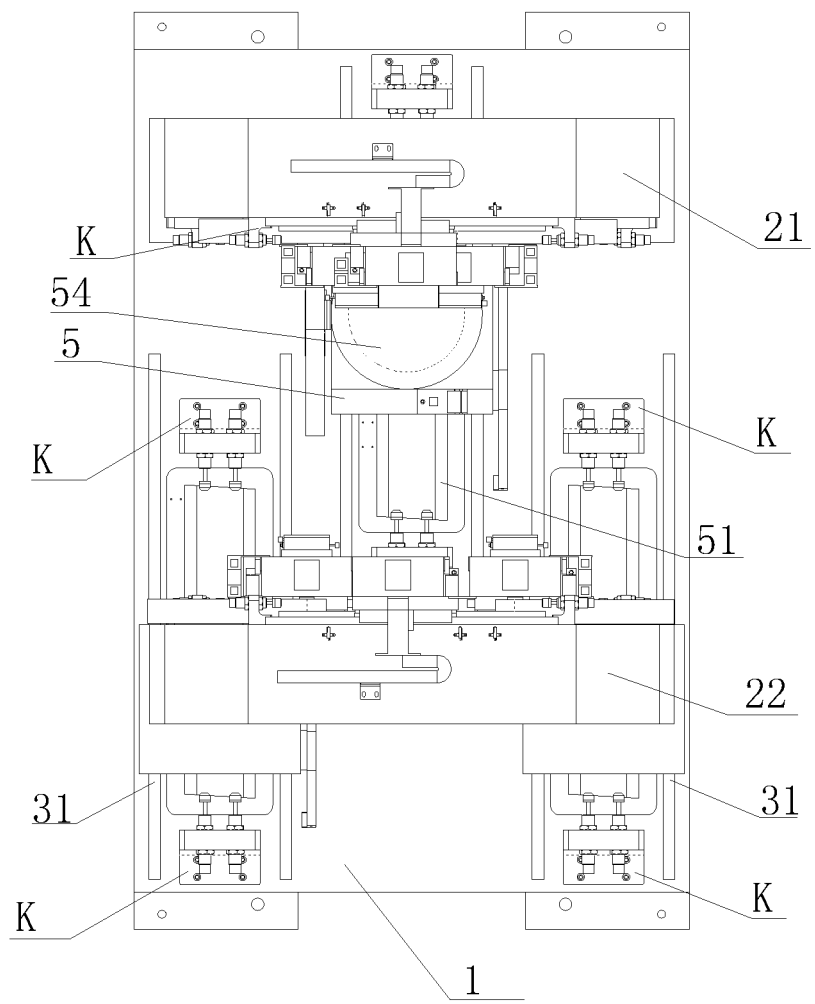
FIG. 9 is a schematic diagram of mounting a pre-printing module on a base.

As shown in FIGS. 8 and 9, the printing system is provided with a pre-printing module, wherein the pre-printing module comprises a pre-printing base 71; a cleaning nozzle 72, a reflux tank 73, a brush 74, a cutting line 76 and a material bearing area 75 are arranged on the pre-printing base 71; the cleaning nozzle 72 is positioned in the reflux tank 73; and the brush 74 is positioned beside the reflux tank 73. The cleaning nozzle 72 sprays cleaning liquid for washing the nozzles; then, the cleaning liquid is gathered in the reflux tank 73 for discharge; the tip ends of nozzles 45 of nozzle assemblies pass through the brush 74; the brush 74 wipes and cleans the tip ends of the nozzles 45; then, the nozzle assemblies extrude materials outwardly until the sections of the extruded materials are stable; the nozzle assemblies pass through the cutting line 76; the cutting line 76 cuts off the materials at the tip ends of the nozzles 45; and the nozzle assemblies move to the objective table 5 for formal printing tasks. The cutting line 76 is a metal filament or other linear or filamentous cutting pieces capable of cutting off the materials at the tip ends of the nozzles 45.

The material bearing area 75 is located between the brush 74 and the cutting line 76. After the nozzles 45 are cleaned through the cleaning nozzles 45 and the brush 74, the materials are extruded out of the material bearing area 75. After the discharging flow of the nozzles 45 is stable, the nozzle 45 assemblies pass through the cutting line.

As a preferred solution, the pre-printing module is provided with a pre-printing guide rail, and the pre-printing module is matched with the pre-printing guide rail in a sliding mode; the pre-printing module is provided with a motion driving mechanism. When the nozzle assemblies are used for pre-printing, the positions of the nozzle assemblies can be fixed, the pre-printing module moves to the position below the nozzle assemblies, and after pre-printing is completed, the pre-printing module is withdrawn from the nozzle assemblies; when the pre-printing module is withdrawn, the tip ends of the nozzles 45 leave the cleaning nozzle 72 and then make contact with the brush 74, finally, the cutting line 76 cuts off the materials at the tip ends of the nozzles 45, and the withdrawing of the pre-printing module is completed. After the pre-printing module is withdrawn, the objective table 5 moves to the positions below the nozzle assemblies.

The pre-printing module is arranged to clean the nozzles 45 of the nozzle assemblies and remove residual materials generated in the last printing process, and after the extruded materials are stable, formal printing is conducted.

Objective Table

As shown in FIG. 9, the objective table 5 is a working platform for receiving the materials from the nozzle assemblies, realizing additive superposition and finally forming a 3D entity component; and the objective table 5 is mounted on the objective table guide rail 51 in a sliding manner.

In some embodiments, the objective table 5 of the biological 3D printing system comprises the printing vessel and the temperature control module 52; and the temperature control module 52 wraps the outer periphery of the printing vessel.

Temperature Control Module 52

The materials used by the biological 3D printing system need to be kept within a specified temperature range, and then additive printing of the materials can be achieved and the survival rate of biological tissue can be increased.

Figure 13:
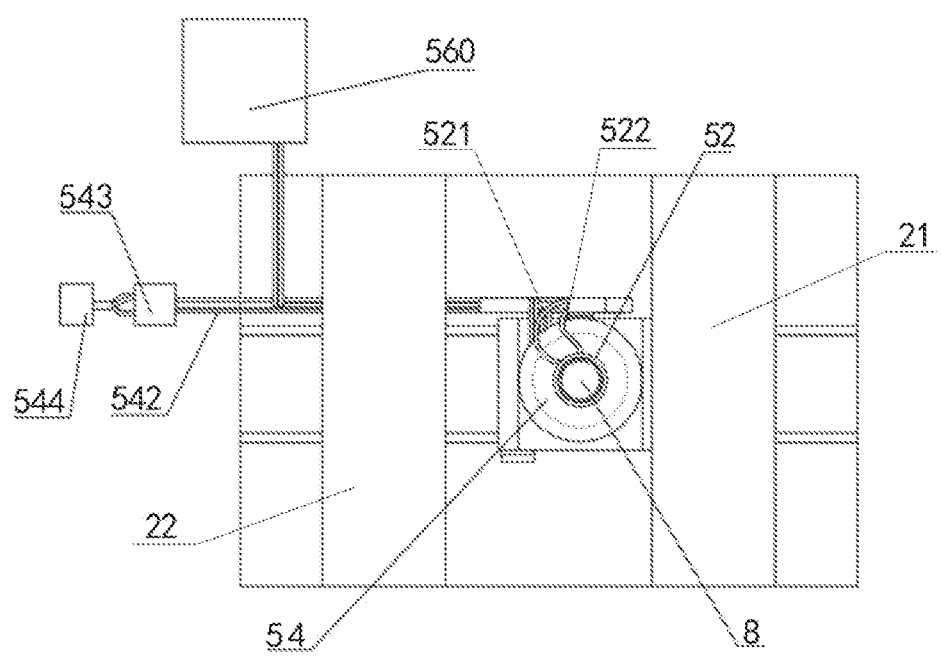
FIG. 13 is a schematic diagram of externally connecting an objective table with a medium container and a vacuum air pump.

In some embodiments, as shown in FIG. 13, the temperature control module 52 comprises a medium cavity or a medium pipeline, the medium cavity or the medium pipeline is provided with a containing cavity 53 for containing the printing vessel 8, the medium cavity is provided with a medium inlet 521 and a medium outlet 522, and a liquid medium with the working temperature is input into the medium cavity or the medium pipeline. The medium cavity is a complete communicated cavity. The printing vessel is a round vessel, and the medium cavity is a round cavity or a spiral pipeline. The shape of the medium cavity only needs to meet that the medium cavity can be evenly matched with the printing vessel.

When the temperature control module 52 works, after the liquid medium outside the medium cavity reaches the specified temperature, the liquid medium is fed into the medium cavity or the medium pipeline, and the position for heating the liquid medium can be an external medium container and heater, such as an oil temperature machine 560. The medium with the working temperature is continuously circulated between the external medium container and the medium cavity, the total amount of the liquid medium is large, the precision is high compared with that under the temperature control of a small amount of medium in the medium cavity, and the difficulty of the temperature control is reduced.

Clamp Module

Figure 11:
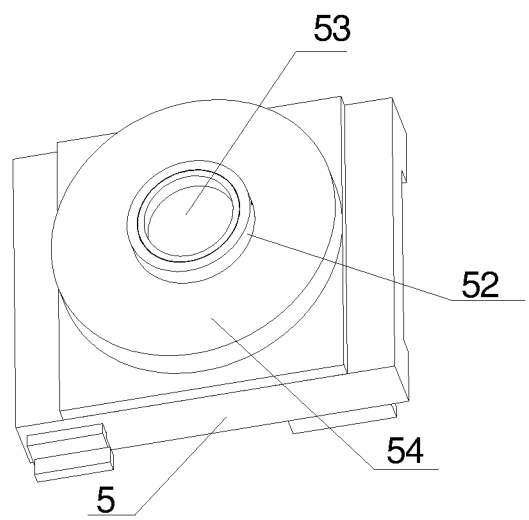
FIG. 11 is a schematic diagram of matching a printing vessel with a temperature control module and a clamp module.
Figure 12:
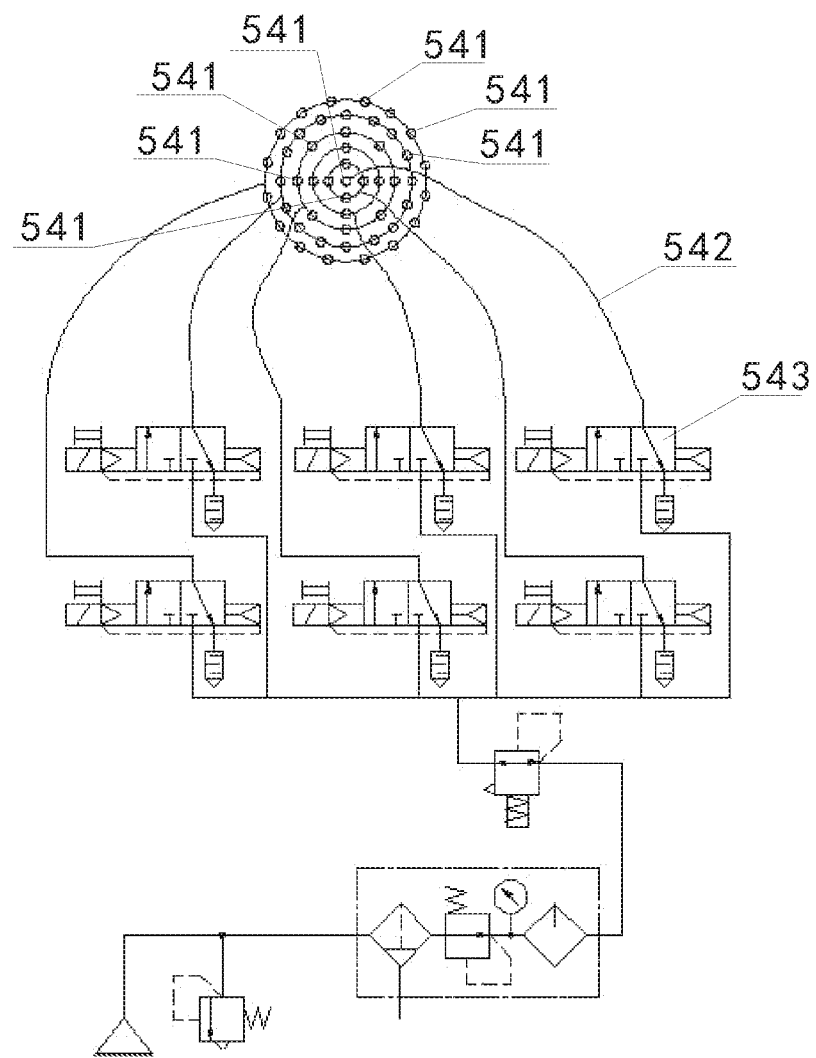
FIG. 12 is a schematic diagram of a clamp module.

In some embodiments, as shown in FIGS. 11 and 12, the objective table 5 comprises a clamp module, and a printing vessel is fixed from the bottom through the clamp module.

The clamp module comprises an adsorption seat 54, a vacuum pipeline 542 and a vacuum air pump 544; the adsorption seat 54 is provided with a micropore array 541, the micropore array 541 communicates with the vacuum pipeline 542, and the vacuum pipeline 542 is connected with the vacuum air pump 544. Before printing work is started, the printing vessel needs to be clamped and fixed, the printing vessel is placed on the adsorption seat 54, the vacuum air pump 544 is started, negative pressure is formed between the adsorption seat 54 and the printing vessel under the action of the micropore array 541 and the vacuum pipeline 542, and the printing vessel is fixed.

The micropore array 541 is composed of a plurality of array units from inside to outside, the centers of all the array units are overlapped, and the outline defined by each array unit is the same as or similar to the shape of the working platform. Each array unit is provided with one or more micropores, and the adjacent micropores communicate through a communicating pipeline. Each array unit is provided with a valve assembly 543, and the valve assemblies 543 are arranged on the vacuum pipeline 542, or the valve assemblies 543 are arranged between the vacuum pipeline 542 and the vacuum air pump 544. For example, the printing vessel is rectangular, and the array units are similar rectangles of the working platform. The micropores are formed by arranging the array units, and clamping of working platforms of different sizes can be achieved.

The printing vessel is a circular vessel, the micropores of the array units form a circle, all the array units are arranged in a concentric circle mode, and the array unit at the centermost position is a central micropore. All concentric circle arrays or one (or more) of the concentric circle arrays can be selectively opened according to the size of the printing vessel, and the printing vessel is fixed. Preferably, the circle centers of the array units are located in the center of the adsorption seat 54. The adsorption seat 54 only needs to have the size for containing the array units, and the shape of the adsorption seat 54 is not limited.

Figure 10:
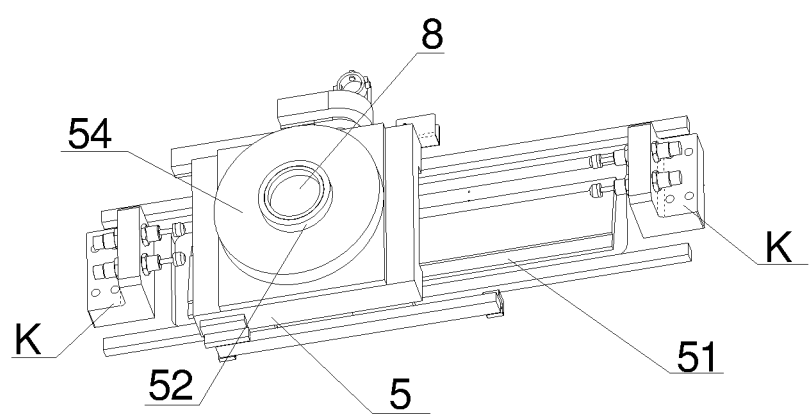
FIG. 10 is a schematic diagram of mounting an objective table on an objective table guide rail.

In some specific embodiments, the objective table 5 is provided with the temperature control module 52 and the clamp module at the same time, as shown in the FIG. 10.

The working process of the biological 3D printing system is introduced by taking the concurrent printing of six different materials arranged in the storage barrels 41 of six nozzle assemblies as an example:

Before printing, the coordinates of the six execution nozzles return to zero, the six execution nozzles sequentially enter a cleaning area and stay on the cleaning fluid nozzles 45 to be washed by cleaning fluid, and the six execution nozzles sequentially penetrate through the wiping brush 74 along the fixed path to wipe the surfaces. The six execution nozzles are sequentially placed in a calibration module for zero setting of the pose coordinates of the six execution nozzles, the middle nozzle on one side of the fixed gantry 21 serves as a reference, four nozzle rotating motors on the outer side rotate inwards by 45°, and a driving motor moves the execution nozzles to form extrusion tail end concurrent points around the execution nozzles. After concurrent is completed, the nozzles are driven to synchronously move horizontally and move into the calibration module to detect the concurrent point error. If the error is beyond the set range, the positions of the five nozzles around the middle nozzle on one side of the fixed gantry 21 are finely adjusted under driving of corresponding Y-axial and Z-axial motors of the nozzles, and detection is conducted again; and if the error is within the set range, the next link is executed. The concurrent nozzle system moves to a pre-printing area for pre-working; taking printing of rectangles and arcs as an example, after the quality of extruded materials is stable, the materials move to penetrate through the cutting line 76; and the height of the cutting line 76 is set as the same height with a nozzle concurrent position in the horizontal direction to cut off residues in nozzles 45. The concurrent nozzle system moves into a working area vessel to start formal extrusion printing. After the printing is finished, four nozzle rotating motors on the outer side return to a 0° position; and six nozzles return to zero after performing cleaning operations in sequence.

The three-axial translation mechanism, the objective table 5 and the pre-printing module are all arranged on the base 1; and the base 1 can provide stable support and a horizontal reference surface to the biological 3D printing system.

Multi-Nozzle Collaborative Bioprinting Method

The present invention provides a method for realizing multi-nozzle concurrent printing by using the above printer. The multi-nozzle collaborative bioprinting method comprises the following steps: placing the concurrent calibration sensor 6 at a path starting point of a printing task, determining the nozzle assemblies needing to perform the printing task, moving the nozzle assemblies to a zero position, and starting the printing task from the zero position by the nozzle assemblies in sequence, or executing the same printing path by all nozzle assemblies performing the printing task, and synchronously starting the printing task from the zero position along the printing path after all the nozzle assemblies reach the zero position.

In some embodiments, when nozzle assemblies start printing tasks from zero positions in sequence, the printing tasks are composed of a plurality of sub-paths, all the sub-paths intersect at one point, and the intersection point of the sub-paths serves as the zero position of the printing system.

For a printing method of an structure with multiple materials distributed at intervals or multiple materials distributed alternately, if the same printing path has multiple printing materials, the nozzle assemblies corresponding to the printing materials are selected as the nozzle assemblies for printing tasks, and a section of continuous path corresponding to each material serves as a sub-path; any sub-path serves as a current task path, the concurrent calibration sensor 6 is moved to the starting point of the current task path, the current nozzle assembly corresponding to the current task path is moved to the zero position, and the concurrent calibration sensor 6 is withdrawn; the current nozzle assembly moves along the current task path; after the current task path is completed, the next path is selected as the current path, and zero position calibration of the concurrent calibration sensor 6 on the current nozzle assemblies and movement of the current nozzle assemblies along the current task path are repeated; and the steps are repeated till printing of all the sub-paths is completed. The starting point position of the current nozzle assembly is calibrated through the concurrent calibration sensor 6 so that multi-material and multi-nozzle continuous cooperative printing is achieved, and printing of the multi-material complex structure can be achieved.

For the situation that a certain material serves as a main printing material, but auxiliary materials need to be added or compounded locally, the nozzle assemblies corresponding to the printing material are selected as the nozzle assemblies for conducting the printing tasks, the concurrent calibration sensor 6 is arranged at the starting point of the printing path, all the nozzle assemblies for conducting the printing tasks reach the zero positions, the concurrent calibration sensor 6 is removed, all the nozzle assemblies for conducting the printing tasks synchronously move along the printing task path, and each nozzle assembly extrudes the material in the task path corresponding to the material of the nozzle assembly and is closed in the non-task path.

For example, when skin tissues are printed, the main material is a corium layer material, but at a part with blood vessels, a blood vessel material and the corium layer material are extruded at the same time, or only the blood vessel material is extruded, thus additive construction of the tissues is realized. After the blood vessel part is printed, the nozzle assemblies for the blood vessel material are closed, and the nozzle assemblies for the corium layer material work. For another example, a certain tissue is made of a basic material, but on the basis of the structure of the basic material, living cells need to be implanted, and then the nozzle assemblies for the basic material works along the printing path, and when the nozzle assemblies reach a position where the living cells need to be implanted, the nozzle assemblies corresponding to the living cell material are also opened to integrate the living cells. Possibly, various materials are compounded in the same printing path, and at the moment, the plurality of nozzle assemblies are opened at the same time to perform the printing task. Possibly, two slice layers are of different materials, at the moment, the nozzle assemblies for the first slice layer material are opened, the nozzle assemblies for the next slice layer material are closed, and after the printing task of the current slice layer is completed, the nozzle assemblies for the current slice layer material are closed; and all the nozzle assemblies are displaced to the height of the next slice layer, the nozzle assemblies for the next slice layer material are used as the nozzle assemblies for the current slice layer material, printing is started, and the operation is continuously carried out in such a way until the printing task is finished, etc.

The present invention shown and described herein may be realized in the absence of any element and limitation specifically disclosed herein. The terms and expressions used herein are used as terms of description rather than limitation, and it is not intended that the use of these terms and expressions exclude any equivalents of the features shown and described or parts thereof, and it should be appreciated that various modifications are possible within the scope of the present invention. Therefore, it should be understood that although the present invention has been specifically disclosed by various embodiments and optional features, the modifications and variations of the concepts described herein may be used by those of ordinary skill in the art and are considered to fall within the scope of protection of the present invention as defined by the appended claims.

The contents of articles, patents, patent applications, and all other documents and electronically available information described or recorded herein are hereby incorporated by reference in their entirety to the same extent as if each individual publication is specifically and separately cited. Applicants reserve the right to incorporate any and all materials and information from any such articles, patents, patent applications or other documents into this application.

The invention claimed is:

1. A multi-nozzle concurrent printing system, comprising a plurality of extrusion nozzle assemblies, a three-axial translation mechanism and an objective table, wherein each nozzle assembly is provided with a nozzle, a storage barrel and a temperature control module; the three-axial translation mechanism comprises an X-axial translation unit, a Y-axial translation unit and a Z-axial translation unit, and the nozzle assemblies are mounted on the Z-axial translation unit; and the printing system is provided with a concurrent calibration sensor, after calibration by the concurrent calibration sensor, the nozzles of all nozzle assemblies are concurrent;

each nozzle assembly corresponds to a respective Z-axial translation unit; or at least two nozzle assemblies share one Z-axial translation unit;

an X-direction translation mechanism comprises a fixed gantry, a movable gantry, an X-direction gantry guide rail matched with the movable gantry and an objective table guide rail matched with the objective table; the fixed gantry and the movable gantry are respectively provided with a Y-direction guide rail and a Z-direction guide rail, the Z-direction guide rail is mounted on the Y-direction guide rail in a sliding manner, and a plurality of nozzle supports are arranged on the Z-direction guide rail in a sliding manner; and each nozzle support corresponds to one Z-direction guide rail, or at least a part of the plurality of nozzle supports share one Z-direction guide rail.

2. The multi-nozzle concurrent printing system according to claim 1, wherein the concurrent calibration sensor comprises a calibration box, and the calibration box is provided with first direction emitters, first direction receivers, second direction emitters and a second direction receiver; a path from each first direction emitter to the corresponding first direction receiver and a path from each second direction emitter to the corresponding second direction receiver have an intersection point; and the intersection point is triggered by needle points of the nozzles to indicate that the nozzle assemblies reach a zero position.

3. The multi-nozzle concurrent printing system according to claim 2, wherein a first direction and a second direction are orthogonal.

4. The multi-nozzle concurrent printing system according to claim 3, wherein a plurality of first direction emitters are provided, and each first direction emitter is provided with a corresponding first direction receiver; a plurality of second direction emitters are provided, and each second direction emitter is provided with a corresponding second direction receiver; a plurality of path intersection points are provided in two directions; and each intersection point corresponds to one nozzle assembly.

5. The multi-nozzle concurrent printing system according to claim 1, wherein the movable gantry and the fixed gantry are centered, the plurality of nozzle assemblies are arranged on the movable gantry, and a plurality of nozzle assemblies are arranged on the fixed gantry.

6. The multi-nozzle concurrent printing system according to claim 1, wherein the nozzle assemblies on the movable gantry and the nozzle assemblies on the fixed gantry are symmetrical about a middle surface of the movable gantry and a middle surface of the fixed gantry.

7. The multi-nozzle concurrent printing system according to claim 1, wherein the movable gantry is provided with three nozzle assemblies, the fixed gantry is provided with three nozzle assemblies, the nozzle assemblies on the same gantry, a nozzle assembly in the middle and the nozzle supports are fixedly connected, and the other nozzle assemblies are connected with the nozzle supports through the rotating mechanisms.

8. The multi-nozzle concurrent printing system according to claim 1, wherein the printing system is provided with a pre-printing module, wherein the pre-printing module comprises a pre-printing base, a cleaning nozzle, a reflux tank, a brush, and a cutting line, the cleaning nozzle, the reflux tank, the brush, and the cutting line are arranged on the pre-printing base, the cleaning nozzle is positioned in the reflux tank, and the brush is positioned beside the reflux tank.

9. The multi-nozzle concurrent printing system according to claim 8, wherein the pre-printing module is provided with a pre-printing guide rail, and the pre-printing module is matched with the pre-printing guide rail in a sliding mode; the pre-printing module is provided with a motion driving mechanism.

* * * * *